United States Patent [19]

Allinquant et al.

[11] 3,904,183
[45] Sept. 9, 1975

[54] SUSPENSION STRUT

[76] Inventors: Fernand Michel Allinquant, 53 Avenue Le Notre; Jacques Gabriel Allinquant, 12 Avenue Arouet, both of 92-Sceaux, France

[22] Filed: Feb. 5, 1974

[21] Appl. No.: 439,753

[30] Foreign Application Priority Data
July 26, 1973 France............ 73.27410
Jan. 9, 1974 France............ 74.00688

[52] U.S. Cl............................................ 267/64 R
[51] Int. Cl.² ...................................... F16F 5/00
[58] Field of Search... 267/64 R, 8 A, 65 R, DIG. 1, 267/DIG. 2

[56] References Cited
UNITED STATES PATENTS
2,883,181  4/1959  Hogan............................ 267/64 R
2,959,410  11/1960  Fullam et al.................... 267/64 R
3,593,978  7/1971  Lohr................................ 267/64 R Primary Examiner—James B. Marbert
Attorney, Agent, or Firm—Staas & Halsey

[57] ABSTRACT

A suspension strut comprises a device for automatic level regulation which functions by the pumping of hydraulic fluid between two hydropneumatic chambers by means of a plunger reciprocating inside a pumping chamber connected to the hydropneumatic chambers by intake and delivery valves, and two annular compartments surrounding the plunger and communicating respectively with the two hydropneumatic chambers. One of these compartments is separated from the pumping chamber by a first seal and from the other compartment by a second seal, each of these seals tightly engaging a cylindrical portion of the plunger until the level of the suspension approaches a mean value in which a tapered portion of the plunger comes opposite the seal, producing a progressively increasing flow of fluid past the seal.

11 Claims, 5 Drawing Figures

SUSPENSION STRUT

FIELD OF THE INVENTION

This invention relates to a suspension strut of the type providing automatic level regulation which operates by self-pumping action and is particularly concerned with a suspension strut also acting as a shock absorber for the suspension of a motor vehicle.

BACKGROUND OF THE INVENTION

Hydropneumatic shock absorbers with self-pumping means are known for use with a suspension the oscillations of which cause, simultaneously with alternate lengthening and shortening of the shock absorber, hydraulic fluid to be pumped from a first chamber into a second chamber until the suspension reaches its mean level, upon which communication is established between the two chambers. In conventional constructions, the first chamber normally contains a reservoir of hydraulic fluid and the second chamber is a hydropneumatic suspension chamber, i.e. a chamber containing hydraulic fluid and gas under pressure forming a pneumatic spring, which cooperates with the suspension to support the sprung parts of a vehicle. When the stationary vehicle is loaded, the suspension drops and as soon as the vehicle begins to move, the pumping device discharges hydraulic fluid from the reservoir into the hydropneumatic suspension chamber, the effect of which is to increase the pressure in the latter and thus its carrying capacity, so that the suspension rises again to its mean level.

In another hydropneumatic shock absorber with pumping means, which is described in detail in Applicant's U.S. Pat. application Ser. No. 259205, on the contrary the second chamber is the suspension chamber, whilst the first chamber contains a reserve of hydraulic fluid under pressure; the gas pressure is selected so that, when the stationary vehicle is fully loaded, the suspension is above its mean level so that by drawing hydraulic fluid from the suspension chamber, the self-pumping means causes the suspension to fall to this mean level. The invention is of application both to shock absorbers of the latter type and to shock absorbers of the conventional type mentioned above.

A major drawback of known hydropneumatic shock absorbers with pumping means is that communication between the two chambers is established as soon as the suspension reaches a pre-determined level. The result of this is that there is an abrupt change of the damping characteristics when the suspension oscillates about this pre-determined level.

The present invention enables this drawback to be removed by ensuring a very gradual diminution of the flow of hydraulic fluid draw from the first chamber into the second chamber and a very gradual establishment of communication between the two chambers when the level of the suspension approaches its mean position.

SUMMARY OF THE INVENTION

Pumping is effected by the relative movement of a plunger and a pumping chamber connected to the first chamber by an intake valve and to the second chamber by a delivery valve. The pumping chamber is separated by a first seal, urged tightly against a cylindrical portion of the plunger, from a first compartment communicating with one of the chambers, which chamber is itself separated by a second seal, urged tightly against the said cylindrical portion, from a second compartment communicating with the other chamber, and the said cylindrical portion is followed by a tapered portion, for example in the shape of a truncated cone, which, when the level of the suspension approaches a mean valve, comes successively opposite the first seal to produce a gradually increasing flow between the pumping chamber and the first compartment, then opposite the second seal to produce a gradually increasing flow between the two compartments.

During levelling off of the suspension, the cylindrical portion of the plunger is opposite the two seals, so that the latter seal off the pumping chamber from the first compartment and the latter from the second compartment, and the pumping means draws hydraulic fluid from the first chamber into the second chamber. There follows from this a progressive displacement of the plunger until its tapered portion comes opposite the first seal and produces a gradually increasing escape of hydraulic fluid which by-passes one of the valves of the pumping chamber. The pumping effect is then progressively reduced, causing a progressive variation in the damping of the suspension. With pumping at a reduced rate, the plunger continues to be displaced unti its tapered portion comes opposite the second seal and produces a gradually increasing flow between the two compartments and thus between the two chambers. In this way, a gradual communication between delivery and intake is produced, whilst the pumping effect is progressively reduced, so that a mean equilibrium level is attained without jerking of the suspension.

Communication between the second compartment and the chamber to which it is connected (which was called "the other chamber" above) preferably affords considerable resistance to the fluid flow in order to prevent too rapid balancing of the pressures in the two chambers. This flow resistance is conveniently effected by the use of a constriction, for example a calibrated orifice or a nozzle, placed between two filters.

In one embodiment, the shock absorber comprises a shock absorber piston provided with a piston rod and sliding inside a cylinder, and the plunger is provided by the piston rod which, during movements of the shock absorber, penetrates into the cylinder which functions as pumping chamber. The first chamber is hydropneumatic reservoir which is connected by the intake valve to the end of the cylinder opposite the piston rod. The delivery valve is located in an annular partition surrounding the piston rod and provided with the first seal; the first compartment, adjacent this partition, communicates with the second chamber, which also contains hydraulic fluid and gas under pressure. As for the second compartment, it is situated beyond the first compartment and is separated from the latter by the second seal and from the atmosphere by a third seal bearing tightly against the piston rod; it communicates with the hydropneumatic reservoir by a channel formed in the cylinder wall.

The annular partition may engage in the cylinder with the interposition of a sealing ring and held against a retaining ring in an annular groove of this cylinder by a supporting washer constituted by a tube section which bears against a block forming the base of the cylinder. The first seal may be constituted by a ring, the inner diameter of which is almost equal to the outer diameter of the cylinder portion of the piston rod, and the delivery valve may be a flat valve constituted by a tempered steel ring fixed by a screw to the upper face of the partition so as to cooperate with one or a number of channels passing through this partition.

In an alternative embodiment, the annular partition is provided with an elastic lining which covers at least part of its inner surface and part of its surface adjacent to the retaining ring. The lining is bonded to these surfaces in such a way as to effect, on one hand the first seal and, on the other hand, the seal between the said partition and the cylinder by nipping the elastic lining between the partition, the retaining ring and the inner surface of the cylinder.

The channel, or each of the channels, passing through the annular partition may open into the first compartment through an enlargement servicing as a seating for a ball-shaped valve traversed by a bore in which is inserted an annular spring which urges it towards the said seating. The ball or balls thus form a delivery valve which ensures a more efficient seal than that of the flat valve in the embodiment described above. The tube section is then preferably replaced by a supporting washer forming, with respect to the ball or balls, a stop which limits their travel.

BRIEF DESCRIPTION OF THE DRAWINGS.

FIG. 1 is a sectional view of a shock absorber suspension strut according to the invention, viewed in axial section;

FIG. 2 is a partial view on a larger scale of the upper part of the shock absorber suspension strut in FIG. 1, showing the arrangement of the sealing joints in detail;

DESCRIPTION OF THE PREFERRED EMBODIMENTS.

The shock absorber suspension strut illustrated in FIGS. 1 to 3 comprises essentially an outer tubular jacket 1 which is impervious to gas and oil, and inner tube 2, a sleeve 3 surrounding the tube 2 and radially spaced therefrom so as to afford a thin annular channel 3a the purpose of which will be explained later, a cylinder head 4 carrying a fixing device 5 intended to be connected to the unsprung part of a vehicle, a piston 6 carried by a rod 7 and sliding inside the tube 2, a guiding and sealing device indicated as a whole by reference 8, and a fixing device 9 carried by the upper end of the piston rod 7 and intended to the connected to the sprung parts of the vehicle. The cylinder head 4 is provided internally with a blind bore 4a (see in particular FIG. 3 in which is inserted a valve-carrying block 4b with sealing between the block 4b and the wall of the bore effected by means of an O-ring 4d; that block 4b is provided with a circumferential rebate 4c into which are fitted the lower ends of the tube 2 and the sleeve 3, and O-ring 4e being placed between the tube 2 and the block 4b, and an O-ring 4f being placed between the sleeve 3 and the wall of the bore 4a of the cylinder head. This head 4 is fitted, with the interposition of an O-ring 4g, into the end of the outer tubular jacket 1 and is held in the latter by crimping as indicated at 1a. The guiding and sealing device 8, (see FIG. 2) which will be described later in detail, comprises an annular block 8a provided internally with an annular recess 8b into which are fitted the upper ends of the tube 2 and the sleeve 3 with the interposition of O-ring 2b, 3b; the annular block 8a is fixed to the outer tubular jacket 1 (see FIG. 1) by a threaded ring 8c which is screwed on to a thread formation 8d of the jacket 1.

The annular gap between the outer tubular jacket 1 and the sleeve 3 is divided by an annular partition 10 into a lower chamber 11 containing oil 12 covered with gas 13 under pressure, forming a pneumatic spring, and an upper chamber 14 divided by an annular elastic membrane 14a into an inner cavity 35 containing oil and an outer cavity 36 containing gas under pressure, thus forming another pneumatic spring.

In the construction illustrated, the annular membrane 14a is provided at its two ends with collars which are enclosed between the outer tubular jacket 1 and seatings made respectively in the block 8a and the partition 10, according to an arrangement similar to that which is described in U.S. Pat. application Ser. No. 259,205 referred to above.

Figure 3:
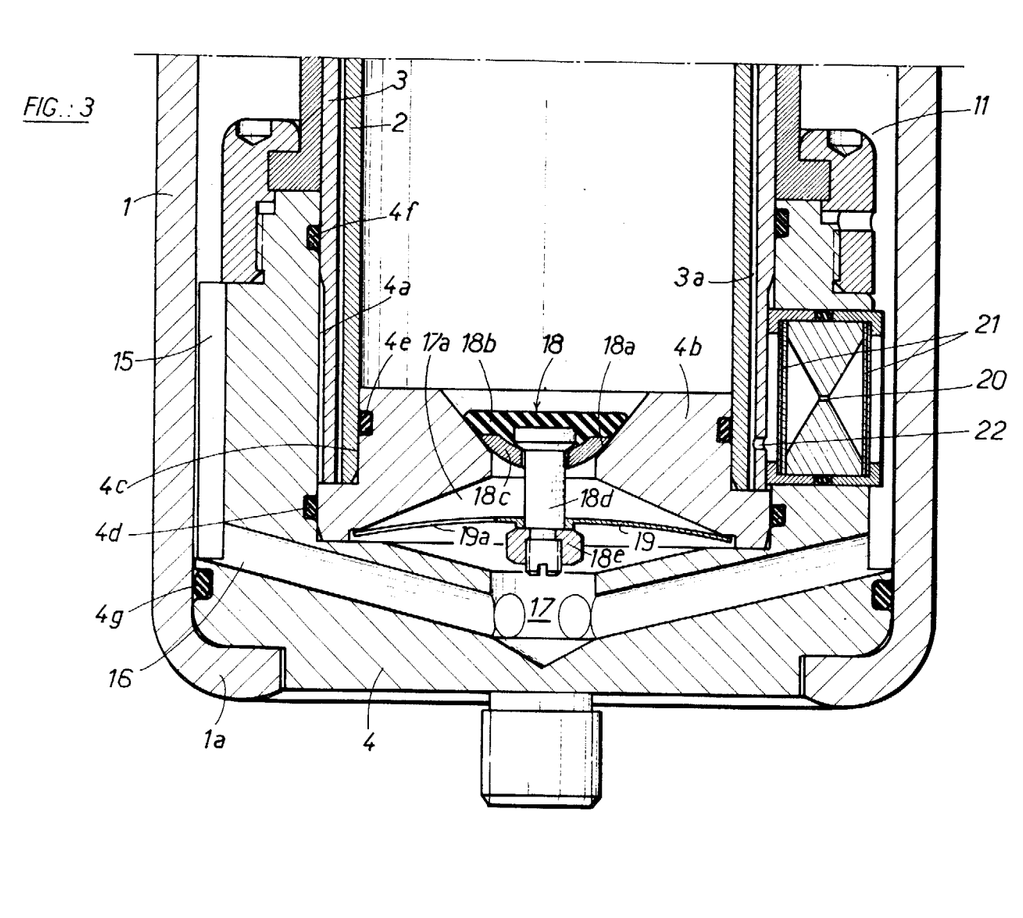
FIG. 3 is a view similar to FIG. 2 but showing the lower part of the shock absorber suspension strut.

The head 4 is provided with a series of peripheral longitudinal notches 15 into which open drillings 16 terminating in a blind counterbore 17 effected at the centre of the head 4 (see FIG. 3). This counterbore 17 communicates with central cavity 17a in the block 4b communicating with the interior of tube 2 through a valve seating 18a. A valve 18, allowing oil to flow from the cavity 17a into the interior of the tube 2, is biassed against its seating 18a by a radial spring 19 located in the cavity 17a. This radial spring is of known type formed with grooves 19a so that the oil can flow from the chamber 11 to the interior of tube 2, passing through the notches 15, drillings 16, counterbore 17, grooves 19a, cavity 17a and seating 18a thereby lifting the valve 18. This valve 18 comprises a rubber valve member 18b bonded to a metallic support element 18c which is pulled downwards by a rod 18d carrying a nut 18e on which the spring 19 acts. In the side wall of the head 4 is mounted a jet 20 protected by filter sheets 21 and communicating on the one hand with the annular channel 3a by means of an orifice 22 formed in the wall of the sleeve 3, and on the other hand with the chamber 11. The arrangement and mounting of the jet 20 and its filters 21 are similar to those which have been described in the applicants' U.S. Pat. application Ser. No. 415,363 and, for that reason, it does not seen necessary to describe them here in detail.

The shock absorber piston 6 (FIG. 1) is of conventional type. It consists of a disc 6a formed with channels 6b and 6c which are closed respectively by foil valves 6d and 6e located on the opposite faces of the disc 6a. The travel of these valves is limited by stop members 6f and 6g. This arrangement is well known and allows the oil filling the interior of tube 2 to pass from the compartment 23 located beneath the piston into the annular compartment 24 surrounding the piston rod, and vice versa, raising valves 6d and 6e respectively so as to ensure damping of the suspension. Piston 6 is fixed to the end of a small diameter part 7a of the rod 7, which is connected by a frusto-conical part 7c to a part 7b having a larger diameter.

Compartment 24 is bounded at its upper end by an annular partition 25 (see particularly FIG. 2) which is fixed in the tube 2 with the interposition of an O-ring 25a and is held against a retaining ring 25b, inserted in an annular groove 2a of the tube, by a tubular section 38 the upper edge of which bears against the base of the block 8a. The annular partition 25 is provided with a ring 27 the inner diameter of which is almost equal to the outer diameter of the cylindrical portion 7b of the piston rod so that, when the portion 7b of the piston rod slides relative to the ring 27, a seal is obtained between the compartment 24 and an annular compartment 30 which is located above the partition 25 and communicates freely with a cavity 35 through a channel 30a extending radially through the block 8a. Partition 25 is traversed by a channel 26 which is normally closed by a valve 28 formed by a tempered steel ring fixed to the upper face of partition 25 by a screw 29. Compartment 24 can thus communicate with the compartment 30 through channel 26 when the valve 28 lifts under the effect of a difference in pressure between these two compartments and also through the gap between ring 27 and the piston rod when the portions 7c or 7a of the latter slide past the ring 27, as is seen, for example, in FIG. 1.

Guiding and sealing of the piston rod when passing through the device 8 are ensured by a "high pressure" seal 31, an anti-friction metal ring 31a, a lip seal 32 and a scraper ring 33. These elements are illustrated in detail in FIG. 2 which shows the piston rod 7 in the position it occupies when the suspension is below its mean level, i.e. with the frusto-conical portion 7c situated below the ring 27.

The "high pressure" seal 31 is held in an annular recess 8k in the block 8a by a threaded ring 8e screwed into this block. The seal comprises an annular part 31b of elastomeric material bonded to a metallic support 31c, which is inserted into the recess 8k with the interposition of an annular sealing member 31d. This annular member is flattened when the ring 8e is screwed on and consequently ensures that the support 31c is sealed externally. A partly cut-away portion on the left in FIG. 2 shows that, when relaxed, the annular part 31b has an internal diameter slightly less than the external diameter of the cylindrical portion 7b is compressed against the cylindrical portion 7b, ensuring a perfect seal. However, when the frusto-conical portion 7c slides past the seal 31, the annular part 31b is no longer pressed against the rod and oil flows out of compartment 30, the rate of flow increasing progressively with the emergence of rod 7.

The anti-friction metal ring 31a comprises a cylindrical bush which is fitted into a bore 8f in block 8a located above the recess 8k, and a collar which is fixed by screws 31e in a rebate 8g in block 8a. This rebate 8g is made in the bottom of a counterbore 8h opening into the upper face of the block 8a by a threaded portion 8i into which is screwed a threaded ring 8j so as to form around the piston rod 7 an annular compartment 34, the upper part of which contains a lip seal 32 held against the ring 8j by a cup 32a formed with holes 32b, so that the pressure of the oil contained in the compartment 34 can act on the lip seal to apply the latter against the piston rod, so as to ensure a good seal. Between the lip joint 32 and the threaded ring 8j is placed a metallic support member 32c which prevents the lip seal from turning.

A channel 34a extends vertically in the block 8a, opening into the base of the compartment 34 and terminating in the base of the annular recess 8b so as to allow this compartment 34 to communicate with the annular channel 3a. The scraper ring 33 is pressed into a recess 33a in the ring 8j by a collar 33b held by screws 33c; the scraper ring has a lip directed outwards to prevent mud and dust from penetrating into the shock absorber.

The shock absorber is illustrated in FIG. 1 in the position of mean level, i.e. that which it normally occupies when the vehicle is unloaded and stationary. When the vehicle is loaded, the piston descends into the tube 2, and the line of juncture 37 between the frusto-conical portion 7c and the large diameter cylindrical portion 7b of the piston rod descends well below the ring 27. When the vehicle begins to move, the oscillations of the suspension bring about alternate extension movements (ascent of piston 6 and its rod 7) and compression movements (descent of piston 6 and its rod into cylinder 2). These movements in their turn causes alternate descreasing and increasing of the volume occupied in cylinder 2 (functioning as a pumping cylinder with its intake 18 and delivery 28 valves) by the piston rod 7 (acting as plunger) and, in consequence, pumping of oil from chamber 11 into chamber 35.

More precisely, at each extension stroke, the volume of the compartment 24 decreases by a certain amount and that of compartment 23 increases by a larger amount. Because of the reduction in volume of compartment 24, a part of the oil contained in its flows through channel 26 and passes, by lifting the valve 28, into compartment 30 which communicates freely through channel 30a with the cavity 35 of chamber 14; another part of the oil contained in compartment 24 passes into compartment 23, flowing through the channels 6c and lifting the valve 6e. However, this flow of oil cannot compensate for the increase in volume of compartment 23; there is thus an inflow of oil from chamber 11 into this compartment 23, the valve 18 lifting from its seating and the gas under pressure 13 impelling a part of the reservoir of oil 12 into the compartment 23 through the notches 15, channels 16 and cavities 17 and 17a. At the subsequent compression stroke the volume of compartment 23 decreases, so that the valve 18 is closed again by its spring 19 and by the pressure of the oil on its upper face and a certain amount of oil passes from the compartment 23 into the compartment 24 through the channels 6b by lifting the valve 6d. However, the volume of compartment 24 increases by a lesser amount, so that a part of the oil passes, through the channel 26 and, by lifting the valve 28, into the compartment 30 and cavity 35.

The passage of oil through channels 6b, 6c in the piston is slowed down by the valves 6d, 6e, producing a damping effect on the force which causes the suspension to oscillate. The effect of pumping oil from the chamber 11 into the cavity 35 is to reduce the pressure of the gas 13 and to increase that of the gas in the cavity 36. The oil pressure in the cavity 35 and the compartment 30 thus rises with each oscillation. At each compression stroke, the oil contained in the cylinder 2 must therefore exert an increasing pressure on the delivery valve 28 to lift it from its seating, so that eventually the rod 7 will penetrate a little less into the cylinder 2 than at the preceding compression stroke.

As pumping continues, the rod 7 progressively emerges from the cylinder 2 until its frusto-conical portion 7c begins to move past the ring 27, thus producing, between this ring 27 and the piston rod, an escape of oil which partly by-passes the delivery valve 28. This escape of oil increases as the rod 7 emerges from the cylinder, so that the pumping effect dimishes progressively until the time when the portion 7a of the rod begins to move past the ring 27; pumping then continues at a much reduced rate and the piston rod slowly continues its withdrawal from the cylinder.

When the line of juncture 37 of the piston rod reaches and then passes the high pressure seal 31 (FIG. 1), this seal is no longer fluid-tight, and a flow of oil, which increases progressively, results between compartments 30 and 34. Oil therefore flows from the cavity 35 (through the channel 30a) and from the compartment 24 ( through the gap between the ring 27 and the portion 7a of the piston rod) into the compartment 30, from the latter into the compartment 34 (by the flow between the seal 31 and the piston rod) and from this latter compartment into the chamber 11 (through the channel 34a, annular channel 3a, orifice 22 and jet 20). The pressure thus falls progressively in the chamber 14 and the cylinder 2 until the mean pressure in the cylinder 2 (compartments 23 and 24), acting on the section of the portion 7b of the rod, balances the load applied to the shock absorber. Rod 7 causes to withdraw from the cylinder, the equilibrium level of the suspension is reached and the shock absorber subsequently functions like a conventional hydraulic telescopic shock absorber, chambers 11 and 14 fulfilling the role of compensation chambers under pressure. However, as compared with conventional shock absorbers can support by no means negligible fraction of the load on the suspension.

It is quite clear that the greater the load on the shock absorber, the higher will be the mean pressure in the cylinder when the equilibrium level of the suspension is reached, since it is the produce of this mean pressure and the cross-sectional area of the portion 7b of the piston rod which has to balance this load. The smaller the rate of flow of oil between the seal 31 and the piston rod, the greater will be this mean pressure; however, this flow of oil increases as the line of juncture 37 of the rod rises above the seal 31. It follows that the more the vehicle is loaded, the lower will be the equilibrium level of the suspension.

When the vehicle is very lightly loaded, the equilibrium level of the suspension is established at a higher level than is illustrated in FIG. 1 and is such that the passage of oil between the seal 31 and the frustoconical portion 7c of the piston rod is sufficient to equalise the pressures in the chambers 11 and 14, so that the oil is at the same mean pressure throughout the shock absorber. The amount of gas provided in the chambers 11 and 14 is chosen so that this mean pressure, acting on the portion 7b of the piston rod, balances the load applied to the shock absorber when the vehicle is travelling with its minimum load (weight of the driver and of a few litres of fuel). When the vehicle is loaded to the fullest extent, the equilibrium level of the suspension will be such that the line of juncture 37 is disposed level with the seal 31, as is illustrated in FIG. 1.

The constriction produced by the jet 20 prevents too rapid balancing of the pressures in the chambers 11 and 14, which could result in shocks being produced in the suspension when the latter is subjected to high frequency oscillations when at or near its equilibrium level.

Compared with convention hydropneumatic shock absorbers with auto-pumping, the shock absorber described above offers the advantage of ensuring greater comfort, since the pumping of oil is by-passed very gradually and the suspension reaches its equilibrium level very gradually. The pumping action is more or less limited by the length of the section of tube 38 which forms a distance piece between the block 8a carrying the seal 31 and the partition 25 carrying the ring 27. This length thus constitutes a parameter which can be pre-selected when the shock absorber is constructed so as to obtain the desired degree of gradualness.

Moreover, the equilibrium level of the suspension varies, as has been explained, with the loading of the vehicle, which is an important advantage with modern vehicles which are equipped with braking adjustors with respect to the load and the degree of depression of the suspensions. A conventional shock absorber with auto-pumping, regulating the level of the suspension at a fixed height, obviously interferes with the functioning of the braking adjustor.

Another advantage of the shock absorber described is its simplicity of construction. The intake and delivery valves, located on either side of the shock absorber piston, are of simple type. In addition, because the shock absorber has no intercommunicating orifice between the various chambers in the central region of the cylinder, it is not necessary to provide a separating membrane between the oil and the gas under pressure in the hydropneumatic chamber which is located in the lower part of the shock absorber (chamber 11 in the embodiment described).

The shock absorber supports substantial part of the load on the suspension, for example 60 kgs. The rear suspension of the vehicle may thus comprise springs and two shock absorbers according to the invention of such size that, when fully loaded, the vehicle is in horizontal trim, i.e. in the most favourable disposition, when the suspension reaches its equilibrium level.

Figure 4:
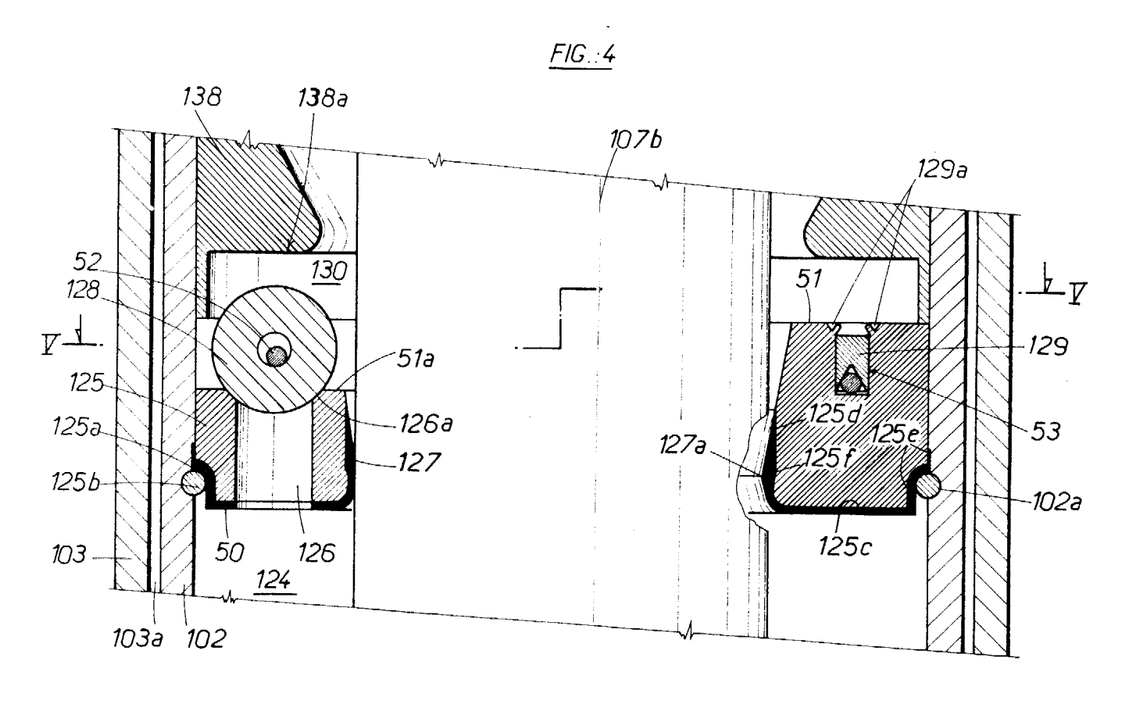
FIG. 4 is a partial view, similar to FIG. 2 but on a still larger scale, showing modifications.
Figure 5:
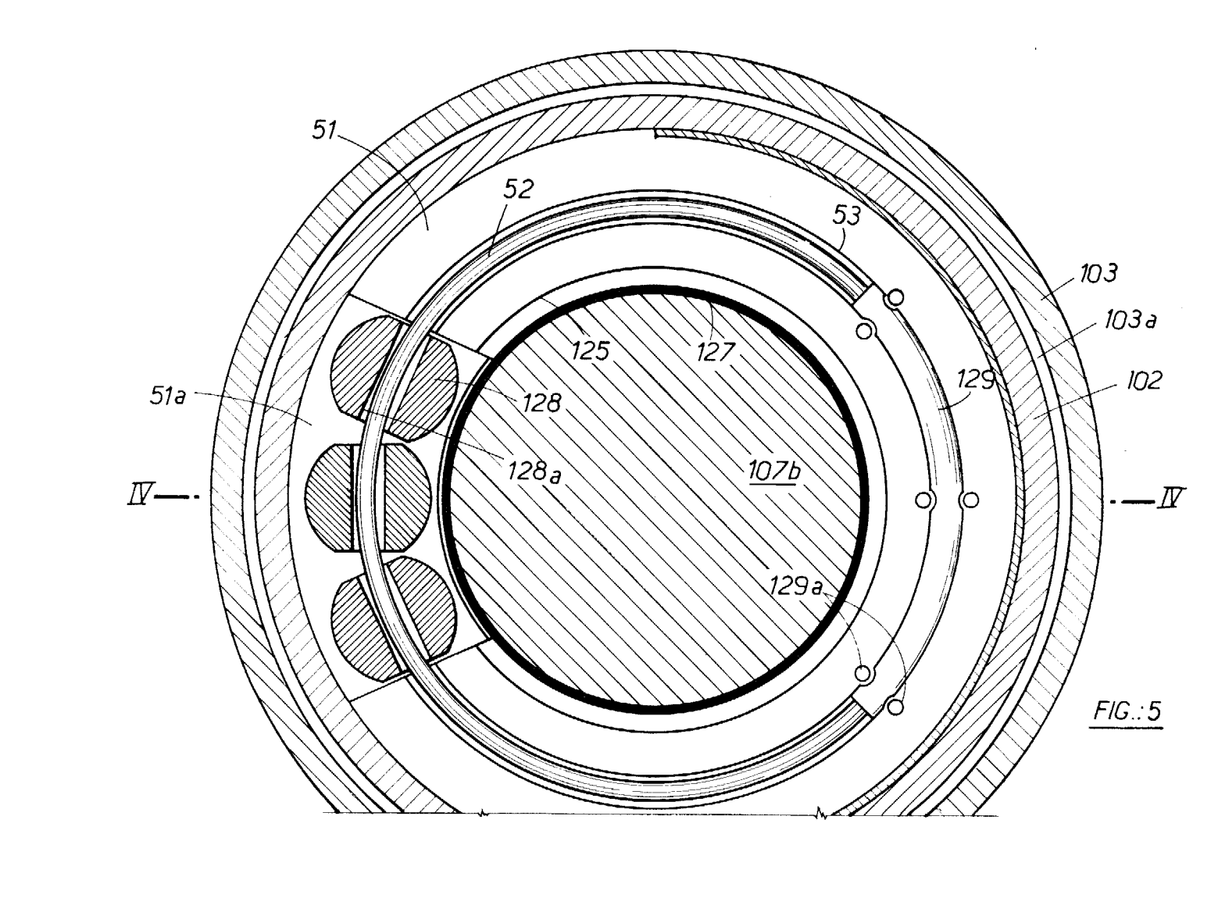
FIG. 5 is a sectional view along the broken line V—V of FIG. 4.

FIGS. 4 and 5 illustrate a modified embodiment, and the components which fulfill the same role as in the previous figures and designated by the same reference numbers plus one hundred.

Here again, the chamber 124 is bounded at its upper end by the annular partition 125, which is fixed in the tube 102 and is held against the retaining ring 125b, located in the annular groove 102a of the tube, by the supporting washer 138, the upper edge of which bears against the base of an annular block which is not shown, similar to the annular block 8 in the previous figures.

On the lower face 125c of the annular partition 125, as well as on the lower portion of its inner surface 125d and on the part of its external surface 125e adjacent to the retaining ring 125b, is bonded a coating 50 of an elastomeric abrasion-resistant material which is resistant to the chemical action of the hydraulic fluid with which the shock absorber is furnished. This elastomeric material, which may be, for example, a mixture based on synthetic rubber of the GOODRICH "Hycar 1043" brand, is applied hot by vulcanisation to the partition 125, which has previously been coated with a compatible synthetic resin.

As shown in FIG. 4, the inner surface 125d is re-entrant at 125f; the portion of coating 50 which covers the surface 125d penetrates into this re-entrant portion 125f, and thereby improves its grip, and in the free state its section takes on the form of two opposed triangles on a common base, as can be seen at 127a as a result of a cutaway portion illustrated on the right of FIG.

4. In use, the part 127a of the elastic coating is flattened against the cylindrical portion 107b of the piston rod, thus forming a very tight seal 125; when the frusto-conical portion, not shown, of the piston rod rises to the level of the seal 125, the latter's sealing efficiency becomes less and less good and the seal eventually assumes its free form (shown at 127a) when the portion of the piston rod opposite to it has a sufficiently small diameter. Seal 127 then allows the fluid to flow from the chamber 124 to the compartment 130, by-passing the delivery valve 128.

The portion 125a of the elastic coating 50 which covers the surface 125c is squeezed between the retaining ring 125b, the tube 102 and the partition 125 supported by supporting washer 138, ensuring a perfect seal between the annular partition 125 and the tube 102. The coating 50 is interrupted where channels 126 open into the lower surface 125c of the partition 125, which faces chamber 124. The other end of the channels 126 opens into the compartment 130 through a frusto-conical enlargement 126a which acts as a seating for the associated valve 128 which is of part-spherical from and is diametrically traversed, in a plane perpendicular to the axis of the channel 126, by a bore 128a.

As seen in FIGS. 4 and 5, the upper face 51 of the annular partition 125 comprises, on one side, a portion 51a in the form of a recessed sector, into which open three channels 126. The corresponding three part-spherical valves 128 are located by their bores 128a on an annular spring 52 which is placed in a groove 53, in the form of an arc of a circle formed in face 51 externally of sector portion 51a and is retained in this groove, in a region diametrically opposite the sector 51a by a part of 129, also in the form of an arc of a circle, crimped at 129a in the groove 53.

In order to prevent excessive lifting of the spherical valves 128, the supporting washer 138 includes a stop surface 138a which restricts travel of the valves.

We claim:

1. In a suspension strut for fitting between unsprung and sprung parts of a vehicle, an automatic level-control device comprising:
   first and second chambers each containing hydraulic fluid and a pneumatic spring;
   a pair of pumping elements connected respectively to the unsprung and sprung parts and comprising a pumping chamber communicating with the first chamber through an intake valve assembly and with the second chamber through a delivery valve assembly, and a plunger reciprocable in the pumping chamber to pump hydraulic fluid from the first chamber to the second chamber through said intake and delivery valve assemblies, the plunger having a cylindrical portion of larger diameter, a cylindrical portion of small diameter, and a tapered portion therebetween;
   a pair of annular compartments arranged end-to-end around the plunger and communicating respectively with the first chamber and with the second chamber, the said pair of compartments comprising a first annular compartment adjacent the pumping chamber and a second annular compartment adjacent the first annular compartment; and
   a pair of annular seals, comprising a first annular seal located between the pumping chamber and the first compartment, and a second annular seal located between the first compartment and the second compartment, each said annular seal having a diameter engaging tightly the larger diameter portion of the plunger, to seal said larger diameter portion, and to engage the tapered portion loosely to produce an escape of hydraulic fluid therebetween.

2. A suspension strut according to claim 1 acting as shock absorber and comprising:
   a cylinder having a cylinder head adjacent the first chamber and carrying said intake valve assembly;
   an annular partition carrying the first annular seal and the delivery valve assembly, the pumping chamber being contained within the cylinder between the cylinder head and the annular partition;
   means supporting the second annular seal, the first annular compartment being disposed between the annular partition and said supporting means;
   an annular end closure provided with a third annular seal engaging said larger diameter portion of the plunger tightly, the second compartment being disposed between the second and third annular seals;
   a passage through the wall of the cylinder to connect the first compartment with the second chamber; and
   a shock absorber piston carried by the plunger and movable reciprocably in the pumping chamber.

3. A suspension strut according to claim 2, comprising a constricted orifice to connect the said channel with the first chamber.

4. A suspension strut according to claim 3, further comprising filter means to filter the hydraulic fluid flowing through the constricted orifice.

5. A suspension strut according to claim 2, further comprising an annular groove formed internally of the cylinder wall, an annular retaining ring fitted into the annular groove, and a spacer member engaging the annular closure so as to locate the said annular partition against the annular retaining ring.

6. A suspension strut according to claim 5, wherein an elastic coating covers at least a part of the inner surface of the said annular partition and of the surface thereof adjacent the said annular retaining ring, the coating being bonded to these surfaces, so as to provide the said first seal and to provide sealing between the said annular partition and the wall of the cylinder by squeezing the elastic coating between the annular partition, the retaining ring and the cylinder wall.

7. A suspension strut according to claim 6, wherein the said part of the inner surface of the annular partition includes an angular re-entrant portion and the part of the elastic coating which covers the said part of the inner surface in its relaxed state has a section in the form of two opposed triangles with a common base.

8. A suspension strut according to claim 2, wherein at least one channel passes through the said annular partition and includes an enlargement where it opens into the said first annular compartment and in which the said delivery valve assembly comprises a ball which engages sealingly the enlargement, an annular spring passing inside a bore in the ball, and wherein retention means are provided to attach the annular spring to the annular partition so as to load the ball against the enlargement.

9. A suspension strut according to claim 8, wherein: the surface of the said annular partition which faces the first compartment includes a recessed sector in which the said enlargement is formed;

an arcuate groove is formed in the said surface externally of the recessed sector;

the annular spring is fitted into the arcuate groove; and the retention means act at a position diametrically opposite to the recessed sector so as to hold the annular spring in the arcuate groove.

10. A suspension strut according to claim 8, wherein the spacer member constitutes a stop acting to restrict the lift of the ball.

11. A hydropneumatic suspension strut and shock absorber assembly comprising:

a cylinder having a cylinder heat and defining a cylinder chamber containing hydraulic fluid;

a shock absorber piston reciprocably mounted to slide in the cylinder and having damping valve-controlled passages therethrough for the hydraulic fluid flowing through said passages response to reciprocating of the piston;

a piston rod having a cylindrical portion of larger diameter, a tapered portion and a cylindrical portion of smaller diameter having a free end carrying the shock absorber piston;

a reservoir chamber adjacent the cylinder head containing hydraulic fluid and a pneumatic spring;

a passage in the cylinder head incorporating an intake valve assembly for the intake of hydraulic fluid from said reservoir chamber into said cylinder chamber;

an annular partition around the piston rod within the cylinder defining therein a first annular compartment and carrying a first annular seal having a diameter tightly engaging the larger diameter cylindrical portion of the piston rod sealing said larger diameter cylindrical portion and loosely engaging the tapered portion permitting the escape of hydraulic fluid between said tapered portion and said first annular seal;

a passage through the annular partition incorporating a delivery valve assembly for the delivery of hydraulic fluid from the cylinder chamber to the first annular compartment;

a hydropneumatic chamber containing hydraulic fluid and a pneumatic spring, and a passage connecting said hydropneumatuc chamber to the first compartment;

end closure means for the cylinder defining a second annular compartment around the piston rod and carrying a second annular seal between said first and second annular compartments, and a third annular seal beyond said second compartment, said second annular seal having a diameter tightly engaging the larger diameter cylindrical portion of the piston rod sealing said larger diameter cylindrical portion and loosely engaging the tapered portion permitting the escape of hydraulic fluid between said tapered portion and said second annular seal, and said third annular seal being adapted to seal the piston rod tightly; and passage means connecting the second annular compartment to the reservoir chamber.

* * * * *